(12) United States Patent
Tang et al.

(10) Patent No.: US 9,306,889 B2
(45) Date of Patent: Apr. 5, 2016

(54) METHOD AND DEVICE FOR PROCESSING MESSAGES

(71) Applicant: Tencent Technology (Shenzhen) Company Limited, Shenzhen (CN)

(72) Inventors: Wenliang Tang, Shenzhen (CN); Tianming Xiao, Shenzhen (CN); Zhaohua Lu, Shenzhen (CN); Xing Zeng, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 275 days.

(21) Appl. No.: 13/971,760

(22) Filed: Aug. 20, 2013

(65) Prior Publication Data

US 2014/0040394 A1 Feb. 6, 2014

Related U.S. Application Data

(63) Continuation of application No. PCT/CN2013/079577, filed on Jul. 18, 2013.

(30) Foreign Application Priority Data

Jul. 19, 2012 (CN) .......................... 2012 1 0251064

(51) Int. Cl.
*H04L 12/58* (2006.01)

(52) U.S. Cl.
CPC ...................... *H04L 51/12* (2013.01)

(58) Field of Classification Search
CPC ... H04L 12/588; H04L 51/12; H04L 63/0263; H04L 12/585; H04L 12/587; H04L 51/24; H04L 63/1408; H04L 63/1416; H04L 12/2602; H04L 63/123; H04L 51/04; G06F 17/30253; G06F 17/30985
USPC ........................................................ 709/206
See application file for complete search history.

(56) References Cited

U.S. PATENT DOCUMENTS 8,429,232 B1 * 4/2013 Appenzeller et al. ......... 709/206
9,083,763 B2 * 7/2015 Rao et al.
(Continued)

FOREIGN PATENT DOCUMENTS

| CN | 1992749 A | 7/2007 |
| CN | 101017523 A | 8/2007 |

(Continued)

OTHER PUBLICATIONS

Tencent Technology, ISRWO, PCT/CN2013/079577, Oct. 24, 2013, 4 pgs.

(Continued)

*Primary Examiner* — Ruolei Zong
(74) *Attorney, Agent, or Firm* — Morgan, Lewis & Bockius LLP

(57) ABSTRACT

Disclosed are a method and device for processing messages. The method includes: determining, when a message sent by software is intercepted, whether the message is a spam message; when the message is not a spam message, having the message displayed in a notification toolbar; and when the message is a spam message, prompting a user in the notification toolbar that the software may be implanted with a malicious plug-in, and providing an option label for the user to judge and select whether to inhibit displaying all messages sent by the software, including the message.

20 Claims, 5 Drawing Sheets

(56) References Cited

U.S. PATENT DOCUMENTS

2009/0064323 A1* 3/2009 Lin .................................. 726/22
2013/0024779 A1* 1/2013 Bechtel et al. ................ 715/752

FOREIGN PATENT DOCUMENTS

| CN | 101170746 A | 4/2008 |
| CN | 101714931 A | 5/2010 |
| CN | 102088679 A | 6/2011 |
| CN | 102523345 A | 6/2012 |
| CN | 102752730 A | 10/2012 |

OTHER PUBLICATIONS

Tencent Technology, IPRP, PCT/CN2013/079577, Jan. 20, 2015, 4 pgs.

* cited by examiner

METHOD AND DEVICE FOR PROCESSING MESSAGES

RELATED APPLICATIONS

This application is a continuation application of PCT Patent Application No. PCT/CN2013/079577, entitled "METHOD AND DEVICE FOR PROCESSING MESSAGES," filed on Jul. 18, 2013, which claims priority to Chinese Patent Application No. 201210251064.X, entitled "METHOD AND DEVICE FOR PROCESSING MESSAGES," filed on Jul. 19, 2012, both of which are incorporated by reference in their entirety.

TECHNICAL FIELD

The present invention relates to the technical field of information processing and, particularly, to a method and device for processing messages.

BACKGROUND

With the development of software technology, more and more software products are developed and applied on the user end, greatly facilitating and enriching people's lives. However, currently there is software that is implanted with malicious plug-ins or adware, which compulsively and anonymously push a large number of harassing messages or advertisements to users, resulting in a lot of inconvenience to the users.

Current methods that are employed in order to prevent the messages pushed by the above-mentioned malicious plug-ins or adware from constantly annoying users includes: scanning messages currently in the notification toolbar for suspicious harassing information or advertisement in the notification toolbar, with the user opening monitoring software that performs the scanning, and notifying the user to select whether to go on allowing certain software to send messages to the notification toolbar.

The prior art suffers from at least the following problems: a user needs to scan current messages in a notification toolbar by opening monitoring software, the user is notified to select whether to go on allowing certain software to send messages to the notification toolbar when suspicious harassment information or advertisement is scanned, and the timing of this notification has a lag.

SUMMARY

In order to solve the problems of the prior art, the embodiments of the present invention provide a method and device for processing messages. The technical solution is as follows.

In one aspect, a method for processing messages includes: determining, when a message sent by a software is intercepted, whether the message is a spam message, where a spam message refers to information that is not customized by a user and that interferes with the user's normal use, work and life; when the message is not a spam message, displaying the message in a notification toolbar; and when the message is a spam message, inhibiting displaying the message in the notification toolbar.

In some embodiments, determining whether the message is a spam message includes: scanning the software to determine whether the software matches with a pre-stored software signature, with the software signature including at least one of a software name, a package name, a size, a certificate, and a program signature code string or a combination thereof; when the software matches with the pre-stored software signature, then determining that the message is a spam message.

In some embodiments, determining whether the message is a spam message includes: scanning the message to determine whether the message includes a preset word; when the message includes the preset word, then determining that the message is a spam message.

In some embodiments, determining whether the message is a spam message includes: scanning the software to determine whether the software matches with a pre-stored software signature, with the software signature including at least one of a software name, a package name, a size, a certificate, and a program signature code string or a combination thereof; when the software matches with the pre-stored software signature, scanning the message to determine whether the message includes a preset word; when the message includes the preset word, then determining that the message is a spam message.

In some embodiments, inhibiting displaying the message in the notification toolbar includes: prompting a user in the notification toolbar that the software may be implanted with a malicious plug-in, and providing an option label for the user to judge and select whether to inhibit displaying all messages sent by the software, including the message, where a malicious plug-in refers to a program that delivers the spam message; when the user selects to inhibit displaying all messages sent by the software, inhibiting displaying the message in the notification toolbar.

In some embodiments, the method further includes: connecting to a server to acquire software signatures collected by the server; and updating locally stored software signatures according to the software signatures collected by the server.

In some embodiments, the method further includes, before determining whether the message is a spam message, determining whether to display the message according to the setup state of the software; when the setup state is to inhibit the reception of the messages sent by the software, then inhibiting displaying the message in the notification toolbar; when the setup state is allowing the reception of the messages sent by the software, then having the message displayed in the notification toolbar; and when the setup state is null, performing the operation of determining whether the message is a spam message.

In another aspect, a device for processing messages is provided, the device including: a determination module, a display control module and an interception module. The determination module is configured to determine, when a message sent by software is intercepted, whether the message is a spam message, with a spam message referring to information that is not customized by a user and that interferes with the user's normal use, work and life. The display control module is configured to display the message in a notification toolbar when the message is not a spam message. The interception module is configured to inhibit displaying the message in the notification toolbar when the message is a spam message.

In some embodiments, the interception module is configured to scan the software to determine whether the software matches with a pre-stored software signature, and when the software matches with the pre-stored software signature, then makes a decision that the message is a spam message, with the software signature including at least one of a software name, a package name, a size, a certificate, and a program signature code string or a combination thereof.

In some embodiments, the determination module is configured to scan the message to determine whether the message includes a preset word; and to determine that the message is a spam message when the message includes the preset word.

In some embodiments, the determination module includes: a signature matching unit for scanning the software to determine whether the software matches with a pre-stored software signature, with the software signature including at least one of a software name, a package name, a size, a certificate, and a program signature code string or a combination thereof; a semantic analysis unit for scanning the message to determine whether the message includes a preset word when the software matches with the pre-stored software signature, and then determining that the message is a spam message when the message includes the preset word.

In some embodiments, the interception module is configured to prompt a user in the notification toolbar that the software may be implanted with a malicious plug-in, and provide an option label for the user to judge and select whether to inhibit displaying all messages sent by the software, including the message, wherein the malicious plug-in is a program that delivers the spam message; and when the user selects to inhibit displaying all messages sent by the software, to inhibit displaying the message in the notification toolbar.

In some embodiments, the device further includes: a signature acquisition module configured to connect to a server and acquire software signatures collected by the server; and a signature updating module configured to update locally stored software signatures according to the software signatures collected by the server.

In some embodiments, the device further includes: a state determination module configured to determine whether to display the message according to the setup state of the software; a first state execution module configured to inhibit displaying the message in the notification toolbar when the setup state is to inhibit the reception of the messages sent by the software; a second state execution module configured to display the message in the notification toolbar when the setup state is to allow the reception of the messages sent by the software; and a third state execution module configured to control the determination module to perform the operation of determining whether the message is a spam message when the setup state is null.

Advantages conferred by the embodiments of the present invention include: when a message sent by software is intercepted, whether the message is a spam message is determined, and when the message is a spam message, then displaying of the message in a notification toolbar is inhibited, and a user can proactively intercept spam messages sent by software in time without scanning messages by opening monitoring software.

BRIEF DESCRIPTION OF THE DRAWINGS

In order to more clearly illustrate the technical solution of the embodiments of the present invention, the following will briefly introduce the accompanying drawings that are used in the description of the embodiments, and apparently the drawings described below are illustrative of some embodiments of the present invention, and a person skilled in the art can also obtain other drawings according to these drawings under the premise of not paying any creative efforts.

DESCRIPTION OF EMBODIMENTS

In order to make the object, technical solution and advantages of the present invention more clear, the embodiments of the present invention will be described in further details below with reference to the drawings.

Figure 1:
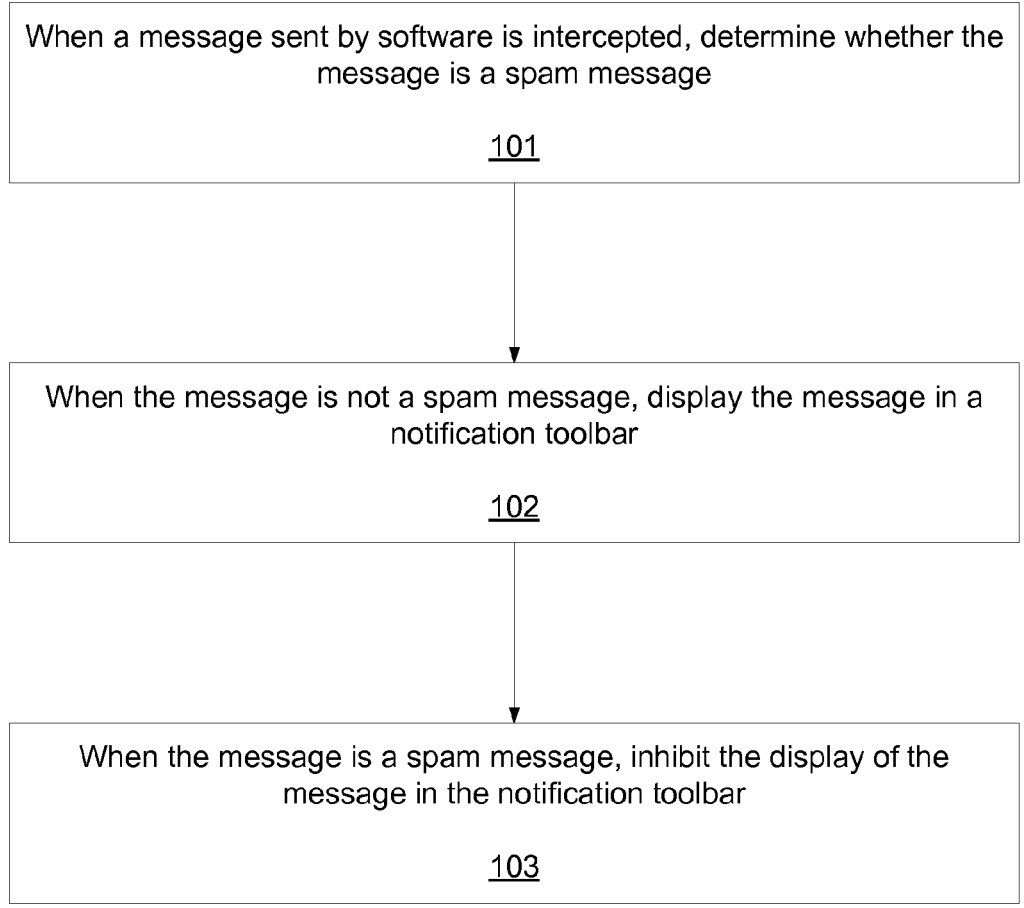
FIG. 1 is a flowchart of a method for processing messages in accordance with some embodiments.

Referring to FIG. 1, a method for processing includes:

(101) determining, when a message sent by software is intercepted, whether the message is a spam message;

(102) displaying, or having the message displayed, in a notification toolbar, when the message is not a spam message; and (103) inhibiting displaying the message in the notification toolbar, when the message is a spam message.

Beneficial effects brought by the embodiments of the present invention are: when a message sent by software is intercepted, a determination as to whether the message is a spam message is made. When the message is a spam message, displaying of the message in a notification toolbar is inhibited. Thus, a user can actively intercept spam messages sent by software in time without scanning messages by opening monitoring software.

Figure 2:
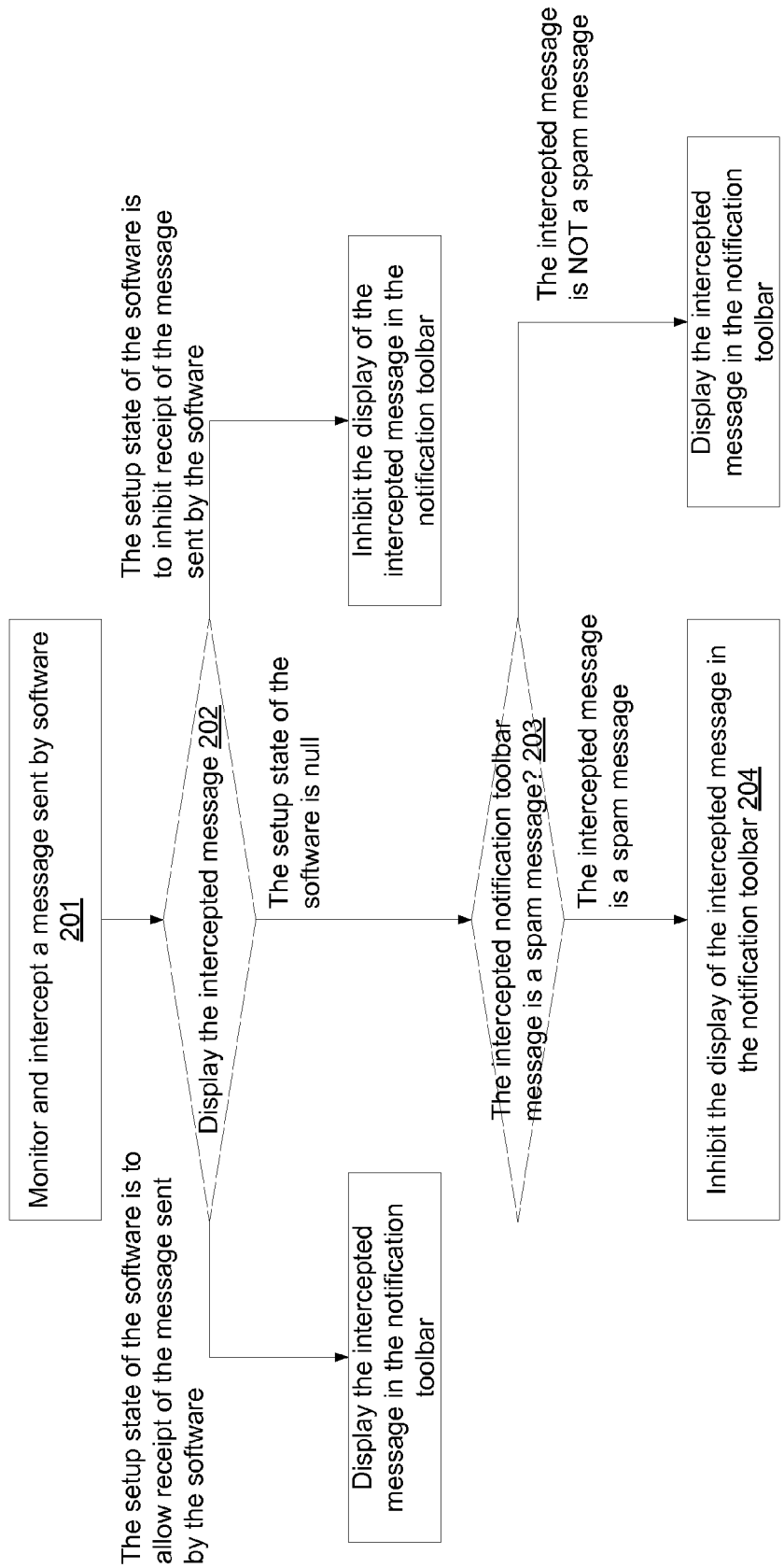
FIG. 2 is a flowchart of a method for processing messages in accordance with some embodiments.

Referring to FIG. 2, the embodiments of the present invention provide a method for processing messages, and the executive body of the method can be a user end like mobile phones, etc., and furthermore, the executive body of the method can be a software management client built in a user end, the method particularly comprising the following steps.

(201) monitoring and intercepting messages sent by software.

In the embodiments of the present invention, a notification toolbar or area can be monitored in real time, and once it is found that there is a message or notification (collectively referred to as "message(s)" herein) in the notification toolbar, the message will be intercepted, where the notification toolbar or area is a message pushing channel based on an interface of a device operating system like Android (by Google Inc. of Mountain View, CA) or iOS (by Apple Inc. of Cupertino, Calif.), and the software pushes messages in the notification toolbar to the user end.

(202) when a message sent by software is intercepted, determining whether to display the intercepted message according to the setup state of the software.

When the setup state of the software specifies that receipt of messages sent by the software is to be inhibited, then display of the intercepted message in the notification toolbar is inhibited, and in this case, the user can open the software to view messages sent by the software.

When the setup state of the software specifies that receipt of messages sent by the software is to be allowed, then the intercepted message is displayed in the notification toolbar.

When the setup state of the software is null with respect to the software (i.e., the setup state doesn't specify that messages from the software is to be allowed or inhibited from being displayed), step 203 is performed.

In some embodiments, a reason for directly determining whether to display the intercepted message from the setup state of the software is because: before intercepting a message sent by the software, other messages sent by the software may have been intercepted, and the user have been notified to select whether to inhibit displaying messages sent by the software, while the user has also chosen whether to inhibit displaying messages sent by the software, and the setup state of the software is recorded at the same time; and therefore, once again a message sent by the software is intercepted, whether to display the intercepted message can be determined according to the setup state of the software without re-confirmation, so as to improve efficiency.

In some embodiments, step 202 is an optional step. That is, step 202 is skipped directly to step 203.

(203) determining whether the intercepted messages is a spam message. In some embodiments, a "spam message" refers to information that is not customized by a user and that interferes with the user's normal use, work and life, such as messages that include illegal or inappropriate contents such as advertisement, deception, pornography or profanity;

When the intercepted message is not a spam message, the intercepted message is displayed in a notification toolbar.

When the intercepted message is a spam message, step 204 is performed.

In some embodiments, determining whether the intercepted message is a spam message includes: scanning the software to determine whether the software matches with a pre-stored software signature, with the software signature including at least one of a software name, a package name, a size, a certificate, and a program signature code string, or a combination thereof; and when the software matches with the pre-stored software signature, then making a decision that the intercepted message is a spam message.

It should be noted that the above described pre-stored software signature is used to identify a malicious plug-in, so it can determine whether the software is implanted with a malicious plug-in by matching with the software signature, and in the embodiments of the present invention, when the scanning is able to match the software with the software signature, then it is considered that the software is implanted with a malicious plug-in, and at this moment, the message sent by the software is considered as a spam message. A malicious plug-in is a program that delivers spam messages. For example a malicious plug-in can monitor user behaviors and report monitored data to the plug-in creator to achieve the purposes of advertising, stealing user private information (such as a game account and password, a bank account and password and other information), etc.

In some embodiments, determining whether the intercepted message is a spam message further includes: scanning the intercepted message to determine whether the intercepted message includes a preset word, with the preset word being a type of keyword involving advertising, pornography, payment, profanity or deception, such as "for sale," "sell," "payment number," "win a lottery," "remittance to," and so on. When the intercepted message includes a preset word, then the intercepted message is determined to be a spam message.

In some embodiments, determining whether the intercepted message is a spam message further includes: scanning the software to determine whether the software matches with a pre-stored software signature, with the software signature including at least one of a software name, a package name, a size, a certificate, and a program signature code string or a combination thereof.; when the software matches with the pre-stored software signature, then scanning the intercepted message to determine whether the intercepted message includes a preset word; and when the intercepted message includes the preset word, then determining that the intercepted message is a spam message.

Here, the use of multiple criteria, of a software signature and a preset word, to judge and determine whether the intercepted message is a spam message can yield more accurate results when filtering out spam messages.

In the embodiments of the present invention, it is possible to set a preset word manually or by software.

In some embodiments, the software signature can be acquired in the following manner: connecting to a server to acquire software signatures collected by the server; updating locally stored software signatures according to the software signatures collected by the server. In some embodiments, when updating the locally stored software signatures, the locally stored software signatures are directly replaced by the software signatures collected by the server.

Here, a server can collect software signatures in the following manner: analyzing the signatures of a variety of known software to obtain software that includes a malicious plug-in, and particularly, the server can analyze the software by judging the function privileges of the software or according to the signature of a known malicious plug-in, to filter same so as to obtain software that includes a malicious plug-in; and/or, obtaining the software that includes a malicious plug-in according to information reported by users, and particularly, a user end provides the user with a reporting interface, so that the user can report software that includes a malicious plug-in according to the usage of the software, such that the server can determine software that includes a malicious plug-in according to the information reported by the user.

In some embodiments, in order to further confirm the accuracy of the collection of software with malicious plug-ins obtained in the above manner, manual analysis is performed on the software with malicious plug-ins obtained through filtering as described above, to conclusively determine whether the abovementioned software obtained through filtering does include a malicious plug-in. Tests on the abovementioned software obtained through filtering are repeatedly performed, and whether the abovementioned software obtained through filtering does include a malicious plug-in is determined according to test results. For example, if 60% or a higher proportion of the messages sent by the abovementioned software obtained through filtering within a predetermined time period are advertisements, then the software is considered to indeed include a malicious plug-in, or the like.

Afterwards, software signatures of the software obtained through filtering that does include a malicious plug-in, such as the software name, package name, size, certificate, and program signature code string, or a combination thereof, are extracted. The extracted software signatures are sent to a user end so that the user end can determine whether the intercepted message sent by the software is a spam message according to the software signatures.

(204) inhibiting displaying the intercepted message in the notification toolbar.

In the embodiments of the present invention, when the received (and intercepted) message is determined to be a spam message, display of the intercepted message in the notification toolbar is directly inhibited without the user's confirmation, proactively and timely intercepting spam messages sent by the software.

In some embodiments, inhibiting displaying the intercepted message in the notification toolbar further includes: prompting a user in the notification toolbar that the software may be implanted with a malicious plug-in, and providing an option label for the user to judge and select whether to inhibit displaying all messages sent by the software, including the intercepted message; and when the user selects to inhibit displaying all messages sent by the software, then display of the received message in the notification toolbar is inhibited.

In the embodiments of the present invention, the user clicks on the option label to select the setup state of the software, such as inhibiting displaying messages sent by the software, or allowing displaying messages sent by the software. Thus, when a message sent by the software is received again, it can be determined whether to display the message sent by the software directly according to the setup state of the software without re judgment (of whether the message is a spam message.

Advantages brought by the embodiments of the present invention include: when a message sent by software is blocked, whether the message is a spam message is determined, and when the message is a spam message, displaying of the message in a notification toolbar is inhibited, and a user can actively block spam messages sent by the software in time without scanning messages by opening monitoring software.

Figure 3:
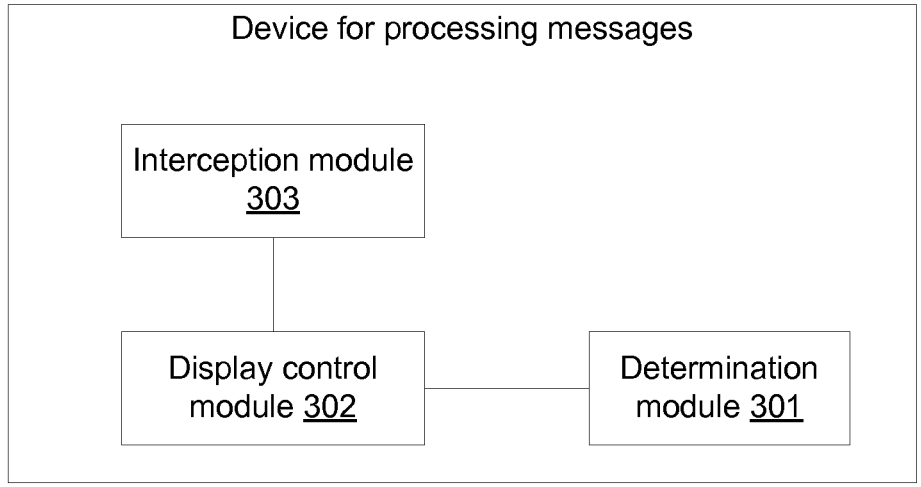
FIG. 3 is a structural schematic diagram of a device for processing messages in accordance with some embodiments.

Referring to FIG. 3, the embodiments of the present invention provides a device for processing messages, and the device includes: a determination module 301, a display control module 302 and an interception module 303.

The determination module 301 is configured to determine, when a message sent by software is intercepted, whether the message is a spam message.

The display control module 302 is configured to display the message in a notification toolbar when the message is not a spam message.

The interception module 303 is configured to inhibit displaying the message in the notification toolbar when the message is a spam message.

In some embodiments, the interception module 301 is configured to scan the software to determine whether the software matches with a pre-stored software signature, and when the software matches with the pre-stored software signature, then make a decision that the message is a spam message. The software signature includes at least one of: a software name, a package name, a size, a certificate, a program signature code string, or a combination thereof.

Furthermore, in some embodiments, the determination module 301 is configured to scan the message to determine whether the message includes a preset word; and when the message includes the preset word, then determine that the message is a spam message.

Figure 4:
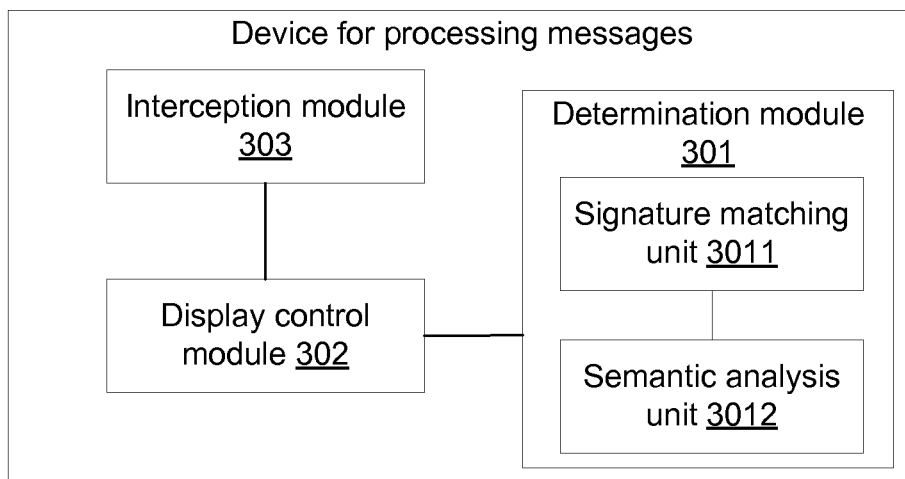
FIG. 4 is a structural schematic diagram of a device for processing messages in accordance with some embodiments.

Furthermore, referring FIG. 4, in some embodiments, the determination module 301 as shown in FIG. 3 includes: a signature matching unit 3011 for scanning the software to determine whether the software matches with a pre-stored software signature, with the software signature including at least one of: a software name, a package name, a size, a certificate, a program signature code string, or a combination thereof; and a semantic analysis unit 3012 for scanning the message to determine whether the message includes a preset word when the software matches with the pre-stored software signature, and then determining that the message is a spam message when the message includes the preset word.

In some embodiments, the interception module 303 as shown in FIG. 3 is configured to prompt a user in the notification toolbar that the software may be implanted with a malicious plug-in, and provide an option label for the user to judge and select whether to inhibit displaying all messages sent by the software, including the message, wherein the malicious plug-in is a program that delivers the spam message; and when the user selects to inhibit displaying all messages sent by the software, displaying of the message in the notification toolbar is inhibited.

Figure 5:
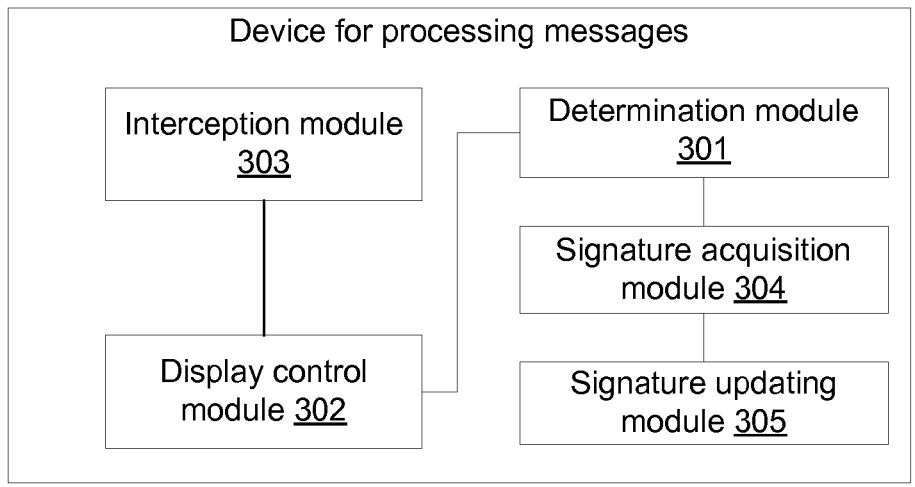
FIG. 5 is a structural schematic diagram of a device for processing messages in accordance with some embodiments.

Additionally, referring to FIG. 5, in some embodiments, a device as shown in FIG. 3 further includes: a signature acquisition module 304 configured to connect to a server to acquire software signatures collected by the server; and a signature updating module 305 configured to update locally stored software signatures according to the software signatures collected by the server.

Figure 6:
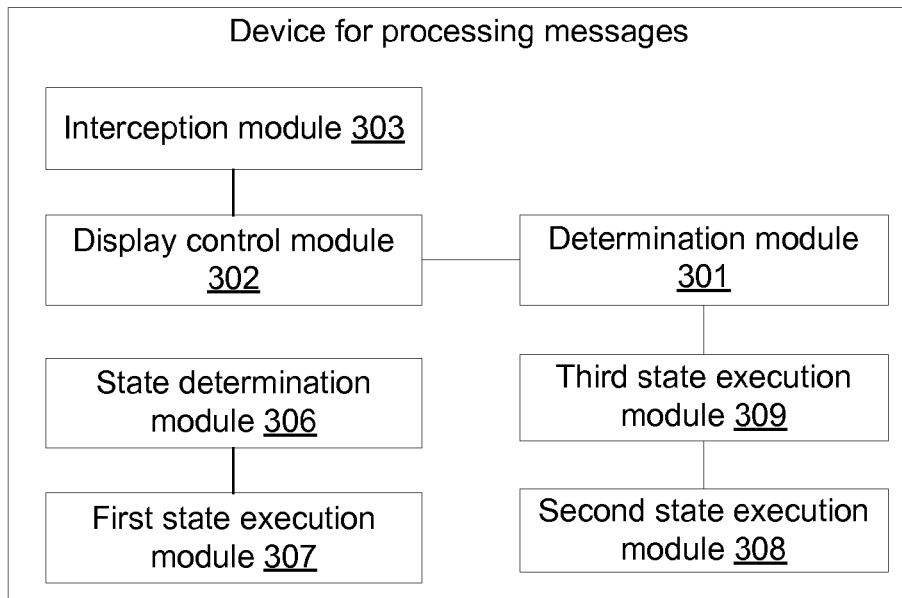
FIG. 6 is a structural schematic diagram of a device for processing messages in accordance with some embodiments.

Furthermore, referring to FIG. 6, in some embodiments, the device as shown in FIG. 3 further includes: a state determination module 306 configured to determine whether to display the message according to the setup state of the software; a first state execution module 307 configured to inhibit displaying the message in the notification toolbar when the setup state is to inhibit the reception of the messages sent by the software; a second state execution module 308 configured to display the message in the notification toolbar when the setup state is to allow the reception of the messages sent by the software; and a third state execution module 309 configured to control the determination module 301 to perform the operation of determining whether the message is a spam message when the setup state is null with respect to the software.

Beneficial effects brought by the embodiments of the present invention are: when a message sent by software is blocked, determining whether the message is a spam message, and when the message is a spam message, then inhibiting displaying the message in a notification toolbar, and a user can actively block spam messages sent by the software in time without scanning messages by opening monitoring software.

Figure 7:
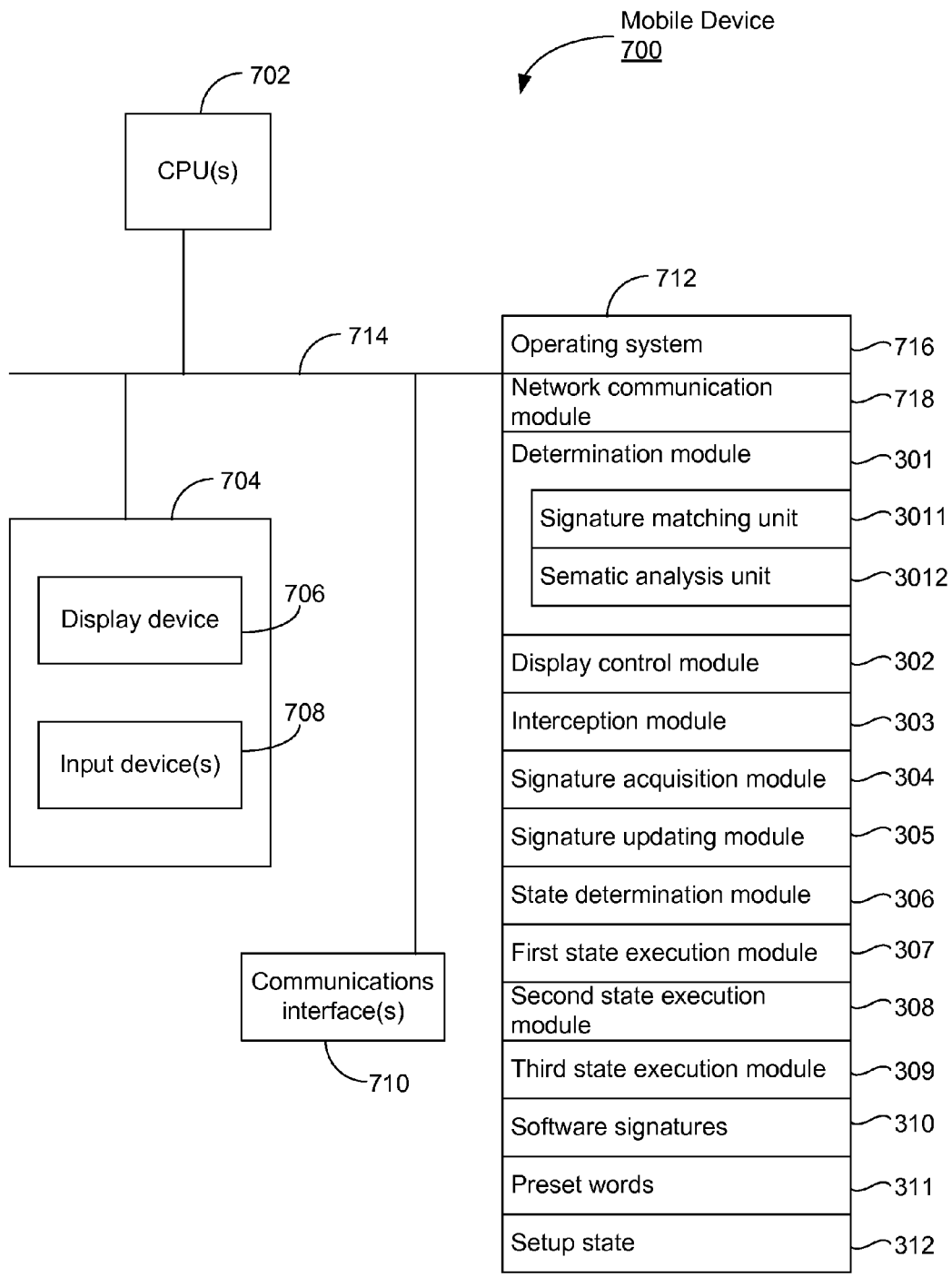
FIG. 7 is a block diagram illustrating a device in accordance with some embodiments.

FIG. 7 is a block diagram illustrating a mobile device 700 in accordance with some embodiments of the present invention. The mobile device 700 typically includes one or more processing units (CPU's) 702 for executing modules, programs and/or instructions stored in memory 712 and thereby performing processing operations; one or more network or other communications interfaces 710; memory 712; and one or more communication buses 714 for interconnecting these components. The communication buses 714 optionally include circuitry (sometimes called a chipset) that interconnects and controls communications between system components. The mobile device 700 optionally includes a user interface 704 comprising a display device 706 and one or more input device(s) (e.g., keyboard, mouse, touch-sensitive surface) 708. In some embodiments, an input device 708 is integrated with the display device 706. For example, a touch screen includes a touch-sensitive surface integrated with the display device 706. Memory 712 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 712 may optionally include one or more storage devices remotely located from the CPU(s) 702. Memory 712, or alternately the non-volatile memory device(s) within memory 712, comprises a non-transitory computer readable storage medium. In some embodiments, memory 712, or the computer readable storage medium of memory 712 stores the following programs, modules and data structures, or a subset thereof:

an operating system 716 that includes procedures for handling various basic system services and for performing hardware dependent tasks;

a network communication module 718 that is used for connecting the mobile device 700 to other computers via the one or more communication network interfaces 710 (wired or wireless) and one or more communication networks, such as the Internet, other wide area networks, local area networks, metropolitan area networks, and so on;

a determination module 301 for determining whether a message, sent by the software and intercepted, is a spam message or not;

a display control module 302 for displaying the message, or having the message displayed, in a notification toolbar when the message determined to be not a spam message;

a interception module 303 for inhibiting displaying the message in the notification toolbar when the message is determined to be a spam message;

a signature matching unit 3011 for scanning the software to determine whether the software matches a pre-stored software signature 310, where the software signature including at least one of: a software name, a package name, a size, a certificate, a program signature code string, or a combination thereof;

a semantic analysis unit 3012 for, in accordance with a determination that the software matches a software signature 310, scanning the message to determine whether the message includes a preset word 311, and determining that the message is a spam message when the message is determined to include a preset word 311;

a signature acquisition module 304 for connecting to a server to acquire software signatures collected by the server;

a signature updating module 305 for updating locally stored software signatures 310 according to software signatures collected by the server; and a state determination module 306 for determining whether to display the message according to the setup state 312 of the software;

a first state execution module 307 for inhibiting displaying the message in the notification toolbar when the setup state specifies that receipt or display of the messages sent by the software is to be inhibited;

a second state execution module 308 for allowing displaying the message in the notification toolbar when the setup state specifies that receipt or display of the messages sent by the software is to be allowed;

a third state execution module 309 for controlling or instructing the determination module 301 to perform the operation of determining whether the message is a spam message when the setup state is null with respect to the software (e.g., does not specify that receipt or display of messages sent to the software is to be inhibited or allowed);

software signatures 310;

preset words 311; and setup state 312.

Software signatures 310 are information that can be used to identify software, programs or applications that sends spam messages (e.g., malicious plug-ins, malware, adware). The signature for a piece of software includes at least one of the following: a software name, a package name, a size (of the software), a certificate, and a program signature code string.

Preset words 311 are keywords that are indicative of spam messages. In some embodiments, the preset words 311 are keywords involving advertising, pornography, payment, profanity, deception or fraud, such as "for sale," "sell," "payment number," "win a lottery," "remittance to," and so on. In some embodiments, when the semantic analysis unit 3012 analyzes a message and determines that the message includes one or more preset words, the message is considered to be a spam message.

Setup state 312 includes setup or settings information with respect to one or more pieces of software. In some embodiments, setup state 312 includes settings or setup regarding whether messages or notifications from a piece of software is allowed or inhibited (e.g., blocked) from being displayed in the notification toolbar of the device; setup state 312 specifies certain permissions, privileges or prohibitions with respect to the software. In some embodiments, for a given piece of software, setup state 312 includes a default setup or settings, which a user can customize later. In some other embodiments, setup state 312 does not specify any setup or settings with respect to a piece of software until the user is prompted to specify a setup (e.g., when the user is prompted to allow or inhibit messages from the piece of software). In some embodiments, the setup state 312 are managed through the operating system 716 (e.g., as device-wide privacy or notification settings).

It should be appreciated that software signatures 310, preset words 311, and setup state 312 are, respectively, stored in memory 712 in a database or any other suitable data structure.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 712 may store a subset of the modules and data structures identified above. Furthermore, memory 712 may store additional modules and data structures not described above.

Although FIG. 7 shows a "mobile device," FIG. 7 is intended more as functional description of the various features which may be present in a set of servers than as a structural schematic of the embodiments described herein. In practice, and as recognized by those of ordinary skill in the art, items shown separately could be combined and some items could be separated.

It should be noted that when the device for processing message in the above-mentioned embodiment processes a message, illustration is made according to the division of the above-mentioned functional modules, and in practical application, the above-mentioned functions can be assigned to be performed by different functional modules as required, i.e., dividing the internal structure of the device into different functional modules to perform all or some of the above-described functions. In addition, the device for processing message and the method for processing messages provided by the above-mentioned embodiments belong to the same concept, and its specific implementation process is seen in the method embodiment, which will not be repeated here.

A person skilled in the art will appreciate that the steps of the abovementioned embodiments can be performed by hardware, or by relevant hardware instructed by a program, where the program may be stored in a computer-readable storage medium, and the above-mentioned storage medium may be a read-only memory, a magnetic or optical disk, etc.

What are described above are merely preferred embodiments of the present invention and is not intended to limit the present invention, and any modification, equivalent replacement, improvement, etc. made within the spirit and principle of the present invention should be included in the scope of protection of the present invention.

What is claimed is:

1. A method for processing messages received by a mobile device, comprising:

at the mobile device:

receiving software signatures correspond to a set of software from a server, wherein the software signatures are collected by the server and extracted by the server based on automatic analysis of signatures of the set of software, reports from users, and repeated test results obtained by the server within a predetermined time period;

when a message sent by software is intercepted, determining whether a setup state of the software has been specified by a user of the mobile device;

in accordance with a determination that the setup state of the software has not been specified by the user of the mobile device, prompting the user in a notification toolbar to judge and select whether to inhibit displaying all messages sent by the software;

determining whether the intercepted message is a spam message according to the received software signatures and preset words;

in accordance with a determination that the message is not a spam message, displaying the message in a notification toolbar; and in accordance with a determination that the message is a spam message, inhibiting displaying the message in the notification toolbar.

2. The method according to claim 1, wherein determining whether the intercepted message is a spam message comprises:

scanning the software to determine whether the software matches with a pre-stored software signature, with the software signature including at least one of a software name, a package name, a size, a certificate, and a program signature code string or a combination thereof, wherein the pre-stored software signature is received from the server and stored on the mobile device; and when the software matches with the pre-stored software signature, determining that the message is a spam message.

3. The method according to claim 2, further comprising:

connecting the mobile device to the server to acquire the software signatures collected by the server; and updating locally stored software signatures according to the software signatures collected by the server.

4. The method according to claim 1, wherein determining whether the intercepted message is a spam message comprises:

scanning the message to determine whether the message includes a preset word using semantic analysis, wherein the preset word is among the preset words stored on the mobile device; and when the message includes the preset word, determining that the message is a spam message.

5. The method according to claim 1, wherein determining whether the intercepted message is a spam message comprises:

scanning the software to determine whether the software matches with a pre-stored software signature, with the software signature including at least one of a software name, a package name, a size, a certificate, and a program signature code string or a combination thereof, wherein the pre-stored software signature is received from the server and stored on the mobile device;

when the software matches with the pre-stored software signature, scanning the message to determine whether the message includes a preset word using semantic analysis, wherein the preset word is among the preset words stored on the mobile device; and when the message includes the preset word, determining that the message is a spam message.

6. The method according to claim 1, wherein inhibiting displaying the message in the notification toolbar comprises:

prompting the user in the notification toolbar that the software may be implanted with a malicious plug-in;

providing an option label for the user to judge and select whether to inhibit displaying all messages sent by the software, including the message, wherein the malicious plug-in as part of the software is a program that delivers the spam message; and when the user selects to inhibit displaying messages sent by the software, inhibiting displaying the message in the notification toolbar.

7. The method according to claim 1, wherein determining whether a setup state of the software has been specified by a user of the mobile device includes:

determining whether to display the message according to the setup state of the software; and when the setup state specifies that receipt of the messages sent by the software is to be inhibited, inhibiting displaying the message in the notification toolbar; or when the setup state specifies that receipt of the messages sent by the software is to be allowed, displaying the message in the notification toolbar; or when the setup state is null with respect to the software, performing the operation of prompting the user.

8. A mobile device for processing messages, comprising:

one or more processors;

memory; and one or more program modules stored in the memory and to be executed by the one or more processors, the one or more program modules including:

a signature acquisition module configured to receive software signatures correspond to a set of software from a server, wherein the software signatures are collected by the server and extracted by the server based on automatic analysis of signatures of the set of software, reports from users, and repeated test results obtained by the server within a predetermined time period;

a state determination module configured to determine whether a setup state of the software has been specified by a user of the mobile device, when a message sent by a software is intercepted;

a third state execution module configured to prompt the user in a notification toolbar to judge and select whether to inhibit displaying all messages sent by the software in accordance with a determination that the setup state of the software has not been specified by the user of the mobile device;

a determination module configured to determine whether the intercepted message is a spam message according to the received software signatures and preset words;

a display control module configured to display the message in a notification toolbar when the message is not a spam message; and a interception module configured to inhibit displaying the message in the notification toolbar when the message is a spam message.

9. The mobile device according to claim 8, wherein the determination module is configured to scan the software to determine whether the software matches with a pre-stored software signature; and when the software matches with the pre-stored software signature, to judge that the message is a spam message, with the software signature including at least one of a software name, a package name, a size, a certificate, and a program signature code string or a combination thereof, the pre-stored software signature is received from the server and stored on the mobile device.

10. The mobile device according to claim 9, further comprising:
a signature acquisition module configured to connect to the server to acquire the software signatures collected by the server; and
a signature updating module configured to update locally stored software signatures according to the software signatures collected by the server.

11. The mobile device according to claim 8, wherein the determination module is configured to scan the message to determine whether the message contains a preset word using semantic analysis, wherein the preset word is among the preset words stored on the mobile device; and when the message contains the preset word, it is determined that the message is a spam message.

12. The mobile device according to claim 8, wherein the determination module comprises:
a signature matching unit configured to scan the software to determine whether the software matches with a pre-stored software signature, with the software signature including at least one of a software name, a package name, a size, a certificate, and a program signature code string or a combination thereof, wherein the pre-stored software signature is received from the server and stored on the mobile device; and
a semantic analysis unit configured to scan the message to determine, when the software matches with the pre-stored software signature, whether the message includes a preset word using semantic analysis, wherein the preset word is among the preset words stored on the mobile device; and determining that the message is a spam message when the message includes the preset word.

13. The mobile device according to claim 8, wherein the interception module is configured to prompt the user in the notification toolbar that the software may be implanted with a malicious plug-in; to provide an option label for the user to judge and select whether to inhibit displaying messages sent by the software, including the message, wherein the malicious plug-in as part of the software is a program that delivers the spam message; and to inhibit displaying the message in the notification toolbar when the user selects to inhibit displaying messages sent by the software.

14. The mobile device according to claim 8, wherein the state determination module further comprises:
a state determination module for determining whether to display the message according to a setup state of the software;
a first state execution module for inhibiting displaying the message in the notification toolbar when the setup state specifies that receipt of the messages sent by the software is to be inhibited;
a second state execution module for displaying the message in the notification toolbar when the setup state specifies that receipt of the messages sent by the software is to be allowed; and
a third state execution module for controlling the determination module to perform the operation of determining whether the message is a spam message when the setup state is null with respect to the software.

15. A non-transitory computer readable storage medium storing one or more programs, the one or more programs comprising instruction which, when executed by a mobile device, cause the mobile device to:
receive software signatures correspond to a set of software from a server, wherein the software signatures are collected by the server and extracted by the server based on automatic analysis of signatures of the set of software, reports from users, and repeated test results obtained by the server within a predetermined time period;
when a message sent by software is intercepted, determining whether a setup state of the software has been specified by a user of the mobile device;
in accordance with a determination that the setup state of the software has not been specified by the user of the mobile device, prompt the user in a notification toolbar to judge and select whether to inhibit displaying all messages sent by the software;
determine whether the intercepted message is a spam message according to the received software signatures and preset words;
in accordance with a determination that the message is not a spam message, display the message in a notification toolbar; and
in accordance with a determination that the message is a spam message, inhibit displaying the message in the notification toolbar.

16. The non-transitory computer readable storage medium of claim 15, including instructions which cause the mobile device to:
scan the software to determine whether the software matches with a pre-stored software signature, with the software signature including at least one of a software name, a package name, a size, a certificate, and a program signature code string or a combination thereof, wherein the pre-stored software signature is received from the server and stored on the mobile device; and
when the software matches with the pre-stored software signature, determine that the message is a spam message.

17. The non-transitory computer readable storage medium of claim 16, including instructions which cause the mobile device to:
connect to the server to acquire the software signatures collected by the server; and
update locally stored software signatures according to the software signatures collected by the server.

18. The non-transitory computer readable storage medium of claim 15, including instructions which cause the mobile device to:
scan the message to determine whether the message includes a preset word using semantic analysis, wherein the preset word is among the preset words stored on the mobile device; and
when the message includes the preset word, determine that the message is a spam message.

19. The non-transitory computer readable storage medium of claim 15, including instructions which cause the mobile device to:
scan the software to determine whether the software matches with a pre-stored software signature, with the software signature including at least one of a software name, a package name, a size, a certificate, and a program signature code string or a combination thereof, wherein the pre-stored software signature is received from the server and stored on the mobile device;
when the software matches with the pre-stored software signature, scan the message to determine whether the message includes a preset word using semantic analysis, wherein the preset word is among the preset words stored on the mobile device; and
when the message includes the preset word, determine that the message is a spam message.

20. The non-transitory computer readable storage medium of claim 15, including instructions which cause the mobile device to:
- prompt the user in the notification toolbar that the software may be implanted with a malicious plug-in;
- providing an option label for the user to judge and select whether to inhibit displaying all messages sent by the software, including the message, wherein the malicious plug-in as part of the software is a program that delivers the spam message; and
- when the user selects to inhibit displaying messages sent by the software, inhibiting displaying the message in the notification toolbar.

* * * * *